United States Patent
Guarino

[19]

[11] Patent Number: 5,817,353
[45] Date of Patent: Oct. 6, 1998

[54] FLAT PACK VACUUM PACKED SEAFOOD PACKAGE AND PROCESS

[75] Inventor: Nicholas A. Guarino, Roatan, Honduras

[73] Assignee: Carnival Brand Seafood Company, Fort Lauderdale, Fla.

[21] Appl. No.: 637,610

[22] Filed: Apr. 25, 1996

[51] Int. Cl.[6] .......................... A22C 25/00; A22C 29/00; A23B 4/06; B65B 31/00
[52] U.S. Cl. .......................... 426/124; 426/129; 426/393; 426/396; 206/778; 53/434; 53/449
[58] Field of Search .................. 426/129, 124, 426/393, 396; 206/778, 784; 53/434, 449, 444, 445

[56] References Cited

U.S. PATENT DOCUMENTS

| | | | |
|---|---|---|---|
| 2,776,215 | 1/1957 | Thomas | 426/124 |
| 2,776,216 | 1/1957 | Thomas | 426/393 |
| 2,800,999 | 7/1957 | Frankenstein | 426/124 |
| 2,920,968 | 1/1960 | Grandy | 426/129 |
| 3,152,915 | 10/1964 | Cover et al. | 426/393 |
| 3,587,839 | 6/1971 | Von Brecht | 426/129 |
| 3,671,272 | 6/1972 | Mixon | 426/129 |
| 3,692,545 | 9/1972 | Moore | 426/393 |
| 3,780,196 | 12/1973 | Domecki | 426/393 |
| 3,895,120 | 7/1975 | Backus | 426/129 |
| 4,029,822 | 6/1977 | Comer | 426/129 |
| 4,057,651 | 11/1977 | Florian | 426/129 |
| 4,141,487 | 2/1979 | Faust et al. | |
| 4,173,655 | 11/1979 | Capo | 426/129 |
| 4,230,729 | 10/1980 | Hoelzel | 426/124 |
| 4,425,368 | 1/1984 | Watkins . | |
| 4,456,164 | 6/1984 | Foster et al. . | |
| 4,571,337 | 2/1986 | Cage et al. . | |
| 4,798,728 | 1/1989 | Sugisawa et al. | 426/129 |
| 4,812,320 | 3/1989 | Ruzek | 426/129 |
| 4,833,862 | 5/1989 | Bortolani et al. | 426/396 |
| 4,835,942 | 6/1989 | Skrmetta . | |
| 4,839,180 | 6/1989 | Standerwick et al. . | |
| 4,873,101 | 10/1989 | Larson et al. . | |
| 4,898,743 | 2/1990 | Ross et al. | 426/129 |
| 4,933,526 | 6/1990 | Fisher et al. . | |
| 4,948,605 | 8/1990 | Lambert, Jr. . | |
| 4,954,356 | 9/1990 | Kappes . | |
| 4,958,480 | 9/1990 | Warner | 426/396 |
| 4,964,507 | 10/1990 | Chen . | |
| 5,044,777 | 9/1991 | Watkins et al. . | |
| 5,085,879 | 2/1992 | Elbaz | 426/129 |
| 5,247,149 | 9/1993 | Peleg . | |
| 5,256,434 | 10/1993 | Conway | 426/393 |
| 5,345,069 | 9/1994 | Grindrod . | |
| 5,431,938 | 7/1995 | Kou . | |
| 5,457,939 | 10/1995 | Bardou et al. . | |
| 5,473,866 | 12/1995 | Maglecic et al. . | |

FOREIGN PATENT DOCUMENTS

| | | | |
|---|---|---|---|
| 374071 | 6/1990 | European Pat. Off. | 426/129 |
| 1258357 | 2/1960 | France | 426/129 |
| 2614877 | 11/1988 | France | 426/124 |
| 59-106253 | 6/1984 | Japan | 426/129 |
| 1190582 | 5/1970 | United Kingdom | 426/124 |
| 2231322 | 11/1990 | United Kingdom | 426/129 |

OTHER PUBLICATIONS

Ford Engineering, p. 163, Jun. 1951.
Quck Frozen Foods, p. 81, Feb. 1952.
Modern Packaging, p. 79, 160 & 162, Jan. 1955.
Food Processing, p. 107, Jul. 1987.

*Primary Examiner*—Steven Weinstein
*Attorney, Agent, or Firm*—Quarles and Brady

[57] ABSTRACT

A process and packaging for shellfish and other seafood, including the use of pallet structure for positioning the product within the packaging to avoid penetration by shells, fish bones or fins of the plastic wrapping film to enable the product to be preserved by flat packing and vacuum sealing and then placed within an outer package designed to promote a pleasing appearance of the product within.

21 Claims, 4 Drawing Sheets

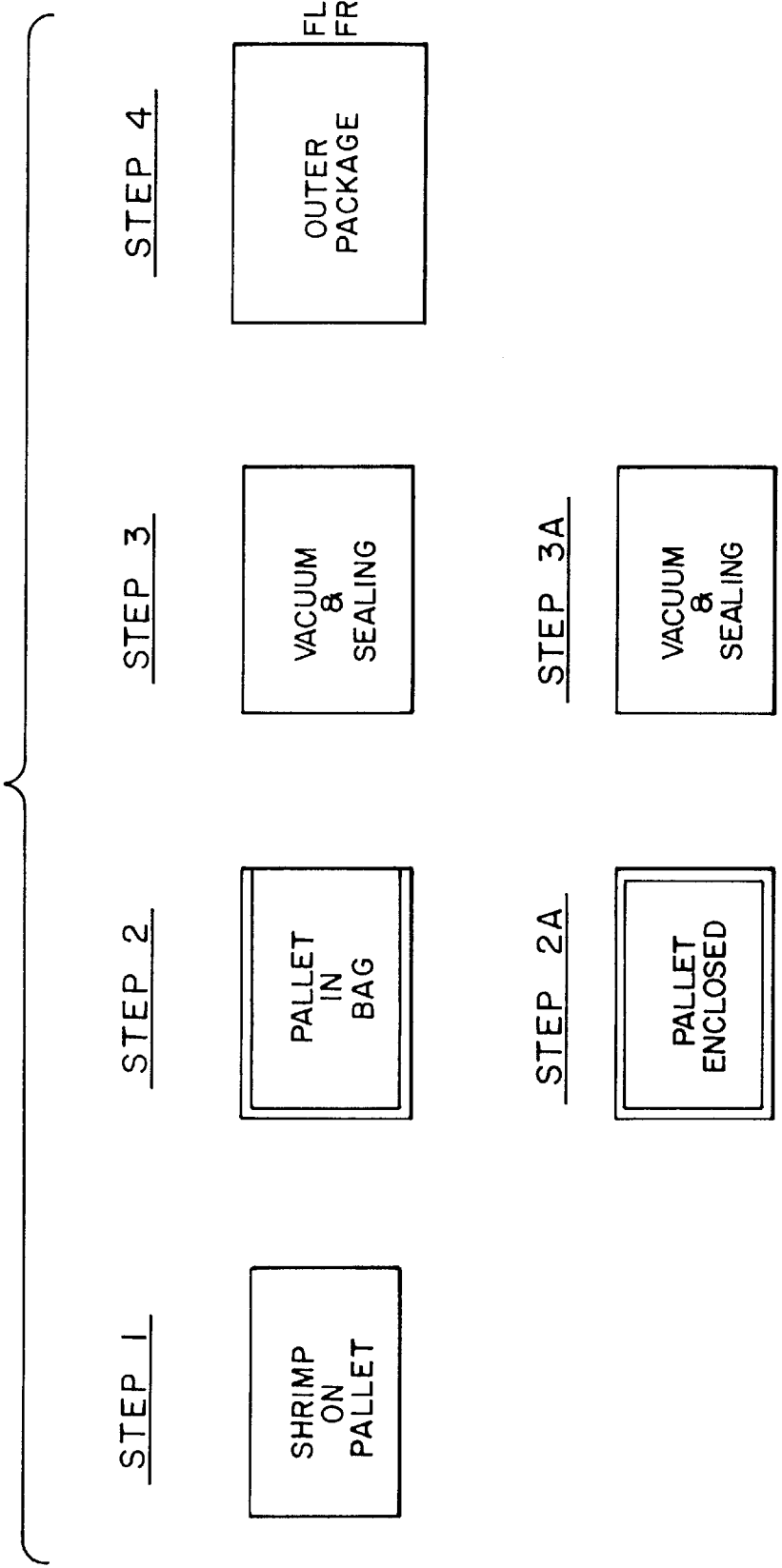

FLAT PACK VACUUM PACKED SEAFOOD PACKAGE AND PROCESS

BACKGROUND OF THE INVENTION

Heretofore, packaging of shellfish in buyer-friendly containers having a good visibility of the product has been limited as the shells of the product were known to penetrate clear packaging, making it inappropriate to vacuum seal the product in marketable flat packaging for retail use.

A similar problem has existed with respect to finned fish, whose fins and bony structure would predictably be a threat to the integrity of the packaging.

With vacuum packaging of any seafood product, there is also significant concern with the potential of mold, yeast, bacteria, especially botulism. Prior to the development at hand, seafood companies have stayed away from attempting to produce a product comparable to that disclosed within. Processes have been tried before to eliminate the threat of botulism. Examples of such processes are nitrogen flushing and radiation. Notwithstanding these attempts, success has not previously been obtainable, primarily because of problems associated with the integrity of the packaging leading to health issues such as botulism.

While vacuum sealing has been successfully used for packaging shellfish without the shells and other fish in bulk, flat packing shell-on shrimp and other seafood in vacuum sealed containers suitable for retail has not been successfully done, explaining the absence of the use of such packaging in the marketplace. While vacuum packaging has been used for a variety of vegetables and meats, this usage has not extended successfully to retail packaging of shrimp and other seafood. An example of vacuum packaging technique of food stuffs is found in U.S. Pat. No. 5,473,866.

SUMMARY OF THE INVENTION

Accordingly, the subject invention is directed to packaging which permits the vacuum packaging of shellfish, such as shrimp, to enable the packaged product to be presented to consumers in attractive packaging while maintaining the integrity of the vacuum packaging to provide a better packaged product than in the past. For aesthetic and packaging reasons, the shrimp or other fish are packed in a flat, carefully presented orientation which enables the product to be successfully packed in the first instance, viewed in its entirety or through a window cut in an outer packaging box.

It is therefore an object of the subject invention to provide a vacuum packaging process and the packaging to enable shellfish with sharp shell-like features and fish with bones and fins, to be safely packaged, diminishing the likelihood of penetration or piercing of the packaging by the shellfish.

It is another object of the subject invention to extend such packaging techniques to use with fish with the potential of penetration of packaging by their bony structure.

It is a further object of the subject invention to provide a process and packaging to present shellfish to the consumer in retail packaging heretofore unknown to the consumer.

It is a related object to provide a process by which seafood is flat packed and then flash frozen and distributed.

It is still a further object of the subject invention to provide shrimp, and other shell-like as well as fish products in desirable packaging to promote favorable product appearance on a scale never before realized.

It is one more object of the subject invention to develop a packaging process whereby concerns of spoilage, botulism, mold, yeast, and bacteria are effectively eliminated from consideration by the integrity of the process and to preserve the product for the longest period of time possible.

It is still another object of the subject invention to provide a process and packaging of shrimp in a cost efficient manner, yet in a manner directed to desirable quantities for purchase.

It is yet another object of the subject invention to provide a process and packaging for shellfish and other fish where the process of packaging is done in an efficient manner without sacrifice to a presentable final product for retail sales.

It is but another object of the subject invention to provide packaging of a design that is attractive to the consumer, yet useful for shellfish and other fish, which heretofore have never been packaged in such manner in retail packaging.

It is another object to improve the product visibility to the consumer.

It is one more object of the subject invention to provide a process and packaging to permit the packaging of shellfish and other fish so as they can be carefully inspected by the consumer upon purchase.

In compliance with the above objects, shellfish and other fish are vacuum packed as follows. For example, if the product to be packed is shell-on or head-on shrimp, the shrimp are placed on a pallet in a basically flat orientation. It is critical that this flat orientation be maintained, because otherwise the shrimp, if they become twisted or bunched, are likely to penetrate the packaging, breaking the vacuum seal, which will have a detrimental effect on the condition of the product.

In the preferred embodiment, a pallet of very specific design is used. One side of the pallet is matted or rough so as to help secure the shrimp in flat orientation and retard sliding or bunching of the shrimp. The other side of the pallet is smooth so as to facilitate the handling and in particular the packaging, as the pallet can be easily slid into a bag or otherwise positioned prior to the step of vacuum sealing the product.

The pallet also may have raised sides which help to ensure that the shrimp will remain flat and well-orientated during the packaging process. The sides also help, as the vacuum sealing takes place so the shrimp along the sides are insulated from direct contact from the sides of the packaging to prevent puncturing, which can turn out to be a critical stressed area as the covering bag fits fairly tightly around the shrimp.

Once the shrimp are placed on the pallet and the pallet is positioned within the bag of plastic film, the vacuum sealing can take place with somewhat standard and well-known equipment. Typically a vacuum means will draw a vacuum within the filled bag and a seal jaw assembly will heat seal the bag once the air is evacuated. The vacuum-heat sealing equipment is not part of the subject invention.

The sealed bag with shrimp contained within can then be placed in an outer package, preferably of cardboard, which will stabilize the bag within and help to hold the shrimp in a flat orientation. The outer package is designed for retail acceptance and will likely include a window so that the shrimp may be examined within the inner package.

On the other hand, the shrimp may be marketed in the sealed bag without the outer package. Sales information can be placed on the bottom of the pallet, which will be seen through the bag material which will be transparent, or on the bag itself.

The shrimp are placed on the pallet in a non-frozen state and upon being packed as disclosed herein, are immediately flash frozen, using any of several commercial techniques, such as, but not limited to, blast freezing, contact freezing or tunnel freezing, and marketed in such frozen state.

BRIEF DESCRIPTION OF THE DRAWINGS

FIG. 4 shows the steps of the process by which seafood is packaged according to the subject invention;

DETAILED SPECIFICATION

Figure 1:
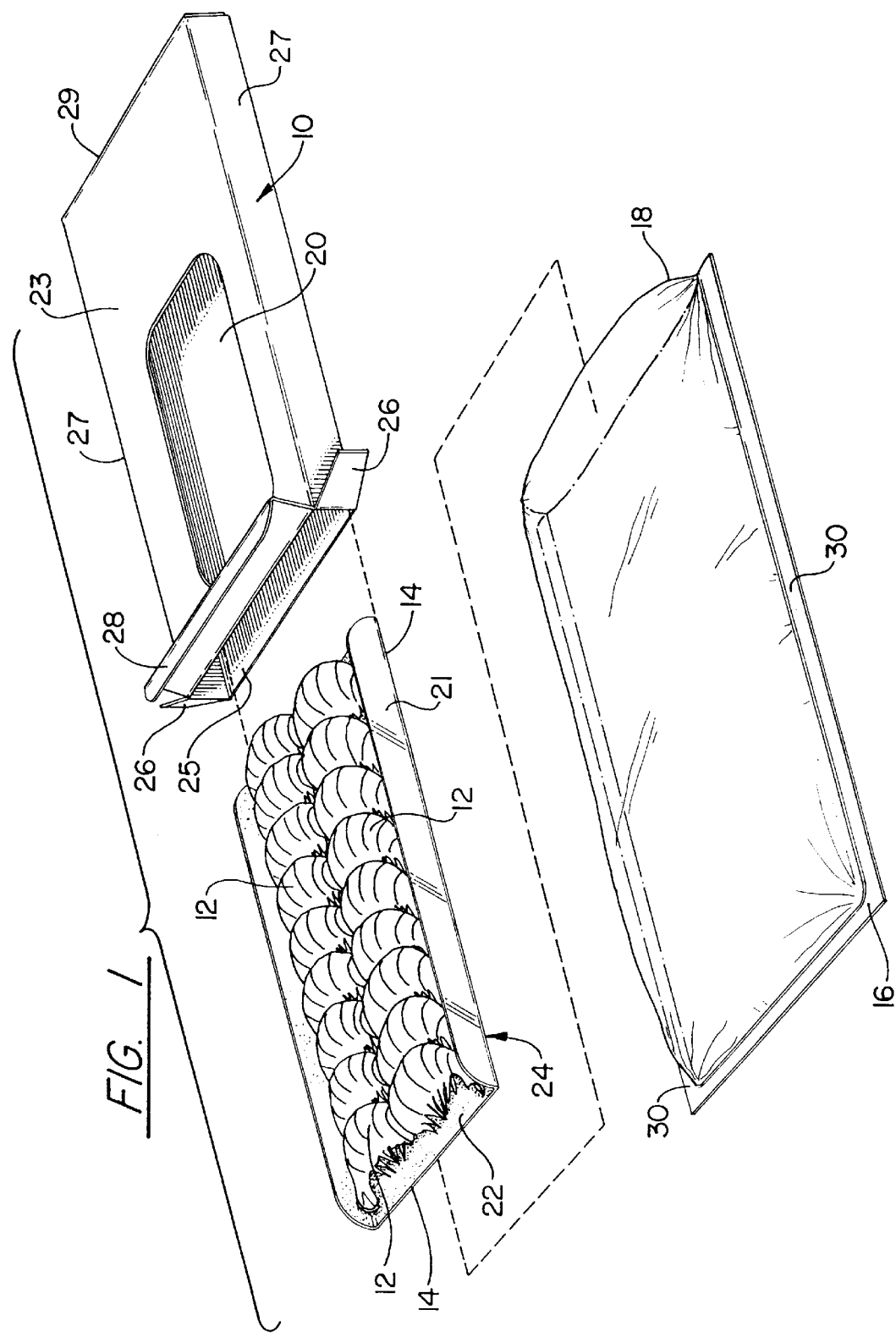
FIG. 1 is a sequential perspective view showing seafood, in this case shrimp on a pallet, the inner packaging to cover and seal the shrimp and the outer container to receive the packaged shrimp.

For a product, as for example shrimp, to be packaged in the package 10 as shown in FIG. 1, shrimp 12 are first carefully positioned on a pallet 14 relatively flat as shown. The pallet 14 will then be inserted into the transparent envelope of packaging 16 as shown and slid within, at which time vacuum will be applied and the envelope or bag 16 will be sealed by the processing equipment. More specifically, a vacuum is created as vacuum means (not shown) causes the air to be sucked from within prior to the sealing of the end 18 of bag 16 as is standard in vacuum packaging of food stuffs. The shrimp 12 typically will be without heads but packed with tails and within the shell.

The envelope or bag 16 containing the product (shrimp 12) is now ready to be placed within the outer package or container 10, having window or opening 20 for inspection of the shrimp 12.

It is important for salability that the shrimp 12 be packaged with the shells on and the pallet 14 maintains alignment of the shrimp 12 to prevent penetration of the envelope 16 by sharp edges of the shells. Specifically, the pallet 14 may be constructed of plastic with some rigidity and enables the shrimp 12 to be so positioned that there is no turning, sliding, twisting, bunching or other disorientation of the shrimp 12 that would bring sharp shell edges into contact with the protective film or envelope 16.

Also, as shown in FIG. 1, the pallet 14 may have edges side structure 21 which will help to keep the desired orientation of the shrimp 12 and help to prevent puncturing of the envelope 16. In particular, as the bag 16 is sealed and then inserted into package 10, stress points might exist along its sides and the pallet side structure 21 helps to protect the bag seal by acting as a buffer between the edges and tails of the shrimp 12 and the sides of bag 16.

Upon further examination of FIG. 1, the pallet 14 will be seen to have two very different surfaces. The top surface 22 on to which the shrimp 12 will be positioned, is matted or roughened to prevent the shrimp 12 from sliding and becoming disoriented which will interfere with the need to have the shrimp 12 flat packed both for appearance and to prevent the penetration of the plastic film structure of envelope 12.

The bottom surface 24 is smooth, as best seen on the sides 21 which are turned up at an approximate 90 degree angle. The smoothness facilitates the handling of the pallet 14 and, in particular, the sliding of the pallet 14 within envelope 16 prior to the vacuum sealing of the envelope by sealing edge or end 18.

It will be appreciated that other seafood such as fish, conch, lobster and calamari may be substituted in place of shrimp. Although shells may not be present, the bony nature of fish and protruding fins, teeth and scales are of concern and the flat orientation of the product is once again necessitated to prevent the puncturing of the envelope 12 and to allow the consumer to view the product.

As can further be seen in FIG. 1, once the shrimp 12, on pallet 14, are placed within bag 16 and sealed, the bag 16 is placed within package or container 10, which is preferably made of cardboard or substitute. The container or cardboard box 10 basically has a top 23 and bottom 25 portion, sides 27, and ends 29. The opening 20 in top portion 23 is cut in such a way to enable the product within to be viewed.

Once the bag 16 is placed within package or container 10, the container 10 is closed by tucking in side flaps 26 and end flap 28.

Figure 2:
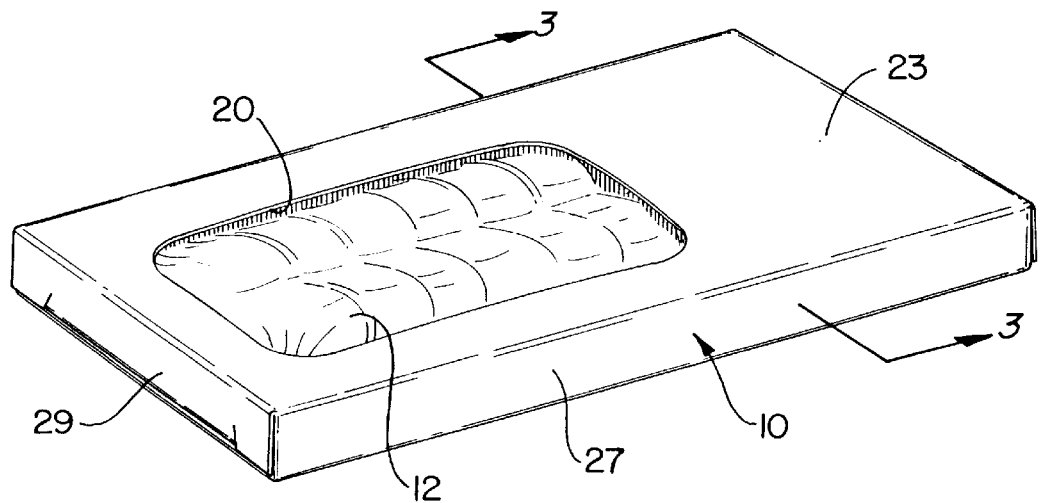
FIG. 2 is a perspective view showing packaged shrimp following the teachings of the subject invention.

As can be seen in FIG. 2, packaged shrimp 12 may be viewed through opening 20 as the flat packed frozen shrimp are presented for sale in commercial establishments such as grocery chains. The packages 10 will typically be stacked within freezer compartments to present an attractive product for the purchasers.

Figure 3:
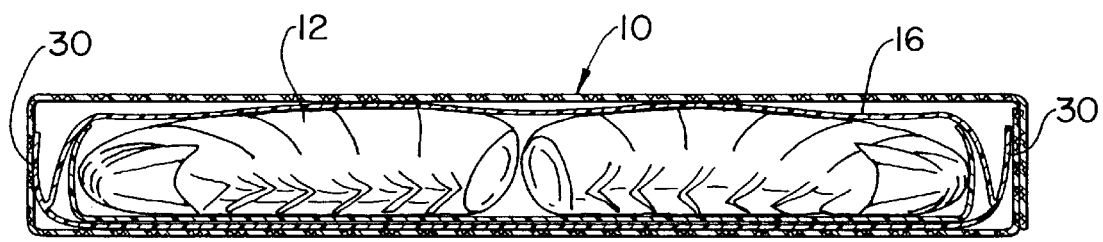
FIG. 3 is a cross sectional view taken along the lines 3—3 of FIG. 2.

With reference to FIG. 3, the packaged shrimp 12 are seen within bag 16, which in turn is within package 10. Sealed edges 30 of the bag 16 can be seen tucked so as to fit snugly within the package 10. The sides 21 of pallet 14 are shown serving as a buffer between sides of bag 16 and the shrimp 12, particularly the outer shrimp shell and jagged tail structure. This applies to the heads, fins, bones and teeth of seafood and other shell configurations such as lobster shells.

With reference to FIG. 4, the key steps of the packing process are presented. In Step 1, the shrimp 12 are placed on the pallet which may be substantially like pallet 14 of FIG. 1 except without sides 21. The shrimp 12 may be placed on pallet 14 by hand, machine (not shown), or by a combination of both. It is important that they lie flat and as part of the process, downward pressure may be asserted on them to achieve a perfectly flat orientation. The risk of the shrimp shells or tail structure penetrating the envelope 16 is increased if the flat orientation is lost. The flat orientation means effectively that the shrimp 12 are lying on their sides in a somewhat natural curled position so they can be placed in close alignment one to another.

Figure 5:
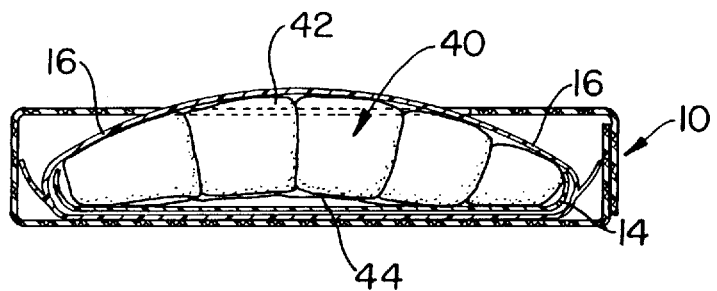
FIG. 5 shows a side view similar to that of FIG. 3, only packed with lobster instead of shrimp.

In the case of lobster 40, the best orientation is to have the lobster outer shell 42 facing up and the inner shell 44 facing downwardly (see FIG. 5). The lobster may extend upwardly so as to bulge through a box opening as shown in FIG. 5. Other products need to be carefully oriented to minimize the likelihood of puncturing of bag 16. For example, fish need to be positioned so that the fins, tail, and bone structure are oriented toward the pallet structure and away from the bag itself.

The pallet 14 is then to be enveloped into bag 16 as shown in Step 2. If three sides of the bag are sealed already, as shown in Step 2 and in FIG. 1, the pallet 14 is pushed into the bag 16 as facilitated by the smooth surface 24 of the bottom of pallet 14. Either machine or a by-hand process may be used in placing the pallet 14 within the bag 16.

As shown in Alternative Step 2, the pallet 14 may be slid onto a sheet of plastic film and another sheet placed on top. Either sheets extending from rolls or discrete sheets can be used. The edges of top and bottom sheets will be joined together and heat sealed simultaneously with the vacuuming of the then-formed bag as represented in Step 3A.

As shown in Step 3, machinery well-known in packaging food stuffs can be used to create a vacuum within bag 16, sealing edge 18 in the process.

Alternatively, as shown in Step 3A and discussed above, the top and bottom sheets can be sealed on four sides, preferably by a standard heat sealing process as part of the vacuum process. The vacuum is applied before the four edges are sealed to create the vacuum packed shrimp within bag 16.

In Step 4 the sealed bag 16 is placed within box or package 10 and the flaps 26, 28 as shown in FIG. 1, closed to complete the packing process. Step 4 can be conducted by hand or by machine, with the latter process being undertaken by packing machinery well known in the food stuffs industry.

At this juncture the packaged shrimp is immediately subjected to flash freezing to preserve the quality and to prevent the formation of bacteria, mold, and yeast and botulism and enabling the product to be shipped and sold in frozen form with greatly increased shelf life. Standard industry equipment is used.

While heretofore reference has been made repeatedly to shell-on shrimp, it must be recognized that the process applies to other seafood, as for example, head-on shrimp, lobster, conch, calamari and fish, both whole and fillets.

Figure 6:
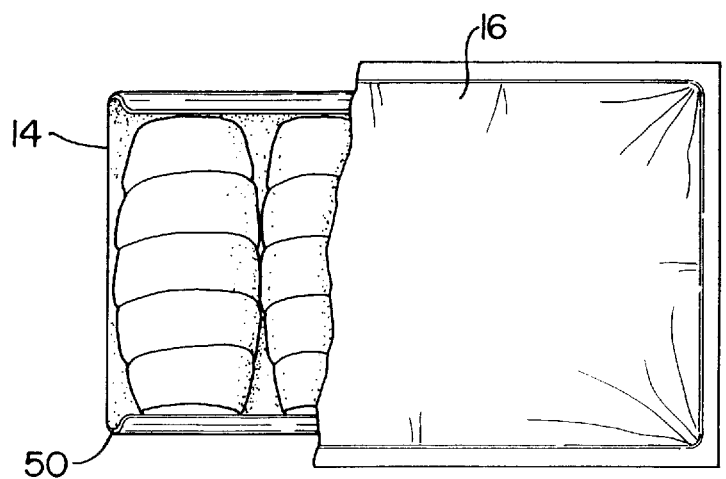
FIG. 6 shows an alternative embodiment whereby the product of FIG. 5 is marketed in the bag 16 (bottom view) alone without an additional outer box.

In an alternative embodiment, shrimp or other seafood can be marketed in the bag 16 without being placed within the container 10. Sales indicia and literature may be placed on the bottom of the pallet 14, or bag, or on a sales page inserted within the bag 16 or attached on the outside. As discussed previously, with respect to FIG. 5, lobster 40 on pallet 14 is shown in bag 16 which is vacuumed and sealed as discussed previously with respect to the shell-on shrimp 12. As seen in FIG. 6, sales information 48 can be placed on the bottom 50 of the packaged product. This can be a sticker type of notice, or material inserted within the bag 16 or printed on the bottom of the bag. In either case, the package, when turned over, allows clear visibility of the product within.

A variety of improvements and modifications to the packaging and process disclosed herein will be apparent. Accordingly, no limitation on the invention is intended by the foregoing description and drawings.

What is claimed is:

1. A process for packaging seafood, comprising the steps of:

placing seafood in an ordered arrangement on a pallet;
   sliding said palletized seafood into a bag to enclose the palletized seafood;
   applying a vacuum to the bag and the palletized seafood;
   sealing the bag and the enclosed palletized seafood under said vacuum; and then,
   flash freezing said sealed bag,
   wherein said pallet has a rough upper surface sufficient to restrain movement of said seafood and a smooth under surface sufficient to facilitate entry of said pallet into said bag, said seafood being placed on said rough upper surface and said ordered arrangement being such that the likelihood of the bag being penetrated or pierced by any parts of the seafood that is capable of doing so is diminished.

2. The process of claim 1 wherein said bag comprises a three-sided bag with opening into which the pallet is placed.

3. The process of claim 1 including the further step of placing the bag within an outer carton.

4. The process of claim 1 wherein the seafood is shell-on shrimp.

5. The process of claim 1 wherein the seafood is lobster.

6. The process of claim 1 wherein the seafood is fish.

7. The process of claim 1 wherein the seafood is conch.

8. The process of claim 1 wherein the step of placing said seafood in an ordered arrangement comprises placing the seafood in a flat orientation.

9. A vacuumized seafood package, comprising:

a pallet;
   seafood positioned on said pallet in an ordered arrangement;
   a sealed bag enclosing said palletized seafood under vacuum; and,
   an outer container enclosing said sealed bag,
   wherein said pallet has a rough upper surface sufficient to restrain movement of said seafood and a smooth under surface sufficient to facilitate entry of said pallet into said bag, said seafood being positioned on said rough upper surface and said ordered arrangement being such that the likelihood of the bag being penetrated or pierced by any part of the seafood that is capable of doing so is diminished.

10. The package of claim 9 wherein the pallet further comprises upstanding side walls.

11. The package of claim 9 wherein said outer container has a viewing opening.

12. The package of claim 9 wherein the seafood is shellfish.

13. The package of claim 9 wherein the seafood is shell-on shrimp.

14. The package of claim 9 wherein the outer container is a cardboard box.

15. The package of claim 9, wherein the ordered arrangement is such that the seafood is oriented flat on the pallet.

16. The package of claim 9 wherein the seafood is lobster.

17. The package of claim 9 wherein the seafood is fish.

18. A vacuumized shrimp package, comprising:

a pallet;
   shrimp positioned on said pallet in a flat orientation;
   a sealed bag enclosing said palletized shrimp under vacuum; and,
   an outer carton enclosing said sealed bag,
   wherein said pallet has a rough upper surface sufficient to restrain movement of said shrimp, a smooth under surface sufficient to facilitate entry of said pallet into said bag, and upstanding side walls for restraining said shrimp, said shrimp being positioned in the flat orientation on said rough upper surface such that the likelihood of the bag being penetrated or pierced by any part of the shrimp that is capable of doing so is diminished, said outer carton having an opening for inspecting said shrimp within the vacuumized bag.

19. A process for packaging shrimp, comprising the steps of:

placing shrimp on a pallet in a flat orientation;
   placing the palletized shrimp on a lower sheet of plastic film;
   placing an upper sheet of plastic film that the extremities of the lower and upper sheets extend beyond the perimeter of the pallet and contact one another;
   applying vacuum and sealing the upper and lower sheets to each other to seal the palletized shrimp under vacuum between the sealed sheets; and then, placing the vacuum sealed palletized shrimp in an outer carton having an opening for viewing the vacuum sealed shrimp, wherein said pallet has a rough upper surface sufficient to restrain movement of said shrimp and a smooth under surface sufficient to facilitate sliding said pallet onto said lower sheet, said shrimp being positioned in the flat orientation on said rough upper surface such that the likelihood of the sheets being penetrated or pierced by any part of the shrimp that is capable of doing so is diminished.

20. The process of claim 19 further including the step of flash freezing the shrimp.

21. A process for packaging seafood, comprising the steps of:

placing seafood on a pallet in a flat orientation;

placing the palletized seafood on a lower sheet of plastic film;

placing an upper sheet of plastic film so that the extremities of the lower and upper sheets extend beyond the perimeter of the pallet and contact one another;

applying vacuum and sealing the upper and lower sheets to each other to seal the palletized seafood under vacuum between the sealed sheets; and then, placing the vacuum sealed palletized seafood in an outer carton having an opening for viewing the vacuum sealed seafood, wherein said pallet has a rough upper surface sufficient to restrain movement of said seafood and a smooth under surface sufficient to facilitate sliding said pallet onto said lower sheet, said seafood being positioned in the flat orientation on said rough upper surface such that the likelihood of the sheets being penetrated or pierced by any part of the seafood that is capable of doing so is diminished.

\* \* \* \* \*